(12) United States Patent
Pilkinton et al.

(10) Patent No.: US 10,078,221 B2
(45) Date of Patent: Sep. 18, 2018

(54) HEAD MOUNTED DISPLAY

(71) Applicant: Mobius Virtual Foundry LLC, Draper, UT (US)

(72) Inventors: John W. Pilkinton, Draper, UT (US); Scott S. Clarke, Cincinnati, OH (US)

(73) Assignee: MOBIUS VIRTUAL FOUNDRY LLC, Draper, UT (US)

( * ) Notice: Subject to any disclaimer, the term of this patent is extended or adjusted under 35 U.S.C. 154(b) by 0 days.

(21) Appl. No.: 15/191,334

(22) Filed: Jun. 23, 2016

(65) Prior Publication Data
US 2016/0377870 A1 Dec. 29, 2016

Related U.S. Application Data

(60) Provisional application No. 62/183,654, filed on Jun. 23, 2015.

(51) Int. Cl.
| G09G 5/10 | (2006.01) |
|---|---|
| G02B 27/01 | (2006.01) |
| G02B 6/06 | (2006.01) |
| G02B 27/00 | (2006.01) |

(52) U.S. Cl.
CPC ............ *G02B 27/0172* (2013.01); *G02B 6/06* (2013.01); *G02B 27/0093* (2013.01); *G02B 2027/014* (2013.01); *G02B 2027/0152* (2013.01); *G02B 2027/0178* (2013.01)

(58) Field of Classification Search
CPC ............ G09G 5/005; G09G 5/10; G09G 5/12; G09G 5/14
See application file for complete search history.

(56) References Cited

U.S. PATENT DOCUMENTS

| 5,406,415 A | 4/1995 | Kelly | |
|---|---|---|---|
| 5,603,687 A * | 2/1997 | Hori | A61B 1/00096 348/45 |
| 8,384,999 B1 | 2/2013 | Crosby et al. | |
| 2005/0024577 A1* | 2/2005 | Tzong | H04N 9/3105 349/172 |
| 2006/0028400 A1* | 2/2006 | Lapstun | G02B 26/06 345/8 |
| 2009/0051879 A1* | 2/2009 | Vitale | G03B 21/28 353/28 |

(Continued)

OTHER PUBLICATIONS

PCT/US2016/03059; "Notification of Transmittal of the International Search Report and the Written Opinion of the International Searching Authority, or the Declaration"; dated Sep. 13, 2016.

*Primary Examiner* — Olga Merkoulova
(74) *Attorney, Agent, or Firm* — Kunzler, PC (57) ABSTRACT

An apparatus and a system are disclosed for a head mounted display utilizing fiber optic cables to feed a projection device. The apparatus includes a head mounted display (HMD) that includes a frame supporting at least one projection surface, the frame configured to maintain the at least one projection surface in a position adjacent to and viewable by at least one eye of a user. The apparatus also includes at least one projection device coupled to the frame and configured to project an image onto the at least one projection surface. The fiber optic cable may be coupled at a first end to the at least one projection device, and at a second end to a remote image source.

16 Claims, 6 Drawing Sheets

(56) References Cited

U.S. PATENT DOCUMENTS

2012/0212398 A1 8/2012 Border et al.
2014/0266987 A1 9/2014 Magyari
2016/0371884 A1* 12/2016 Benko .................. G06T 19/006

* cited by examiner

HEAD MOUNTED DISPLAY

CROSS-REFERENCES TO RELATED APPLICATIONS

This application claims the benefit of U.S. Provisional Patent Application Number 62/183654 entitled "HEAD MOUNTED DISPLAY" and filed on Jun. 23, 2015 for John W. Pilkinton et al., which is incorporated herein by reference.

FIELD

This disclosure relates generally to the field of optics, and more particularly relates to virtual reality headsets utilizing adjacent-to-eye projection systems.

BACKGROUND

Virtual reality head mounted displays (HMDs) are becoming increasingly popular, and the applications that implement virtual reality, beyond the traditional gaming systems, are likewise increasing. In practically all instances, the different types of HMD function in a manner similar to 3D goggles in that the HMD displays an image to each eye. The images may be generated in such a fashion as to cause the wearer of the HMD to perceive a 3D environment.

The goal is to present a world that appears realistic and behaves like the real world. Generally, HMDs also contain tracking hardware to determine a position and orientation of the HMD so that the images may be adjusted for the position and orientation. As such, the wearer may "look around" and have the images adjust according to the position and orientation (i.e., direction) of the gaze of the wearer.

Current HMDs present the images directly into the eyes of the wearers. Different mechanisms have been developed to accomplish this, including positioning a display in front of the eyes of the wearer, positioning a projector in front of the eyes of the wearer, or using mirrors or prisms in front of the eyes of the wearer. Each of these examples, and many others not mentioned, suffers from the same issue, in that positioning display or projection hardware out in front of the wearers face increases the weight of the HMD, and decreases the comfort of the wearer. If the goal is to immerse a user in a virtual world, wearing heavy equipment suspended in front of the wearers eyes distracts the user from the virtual world.

SUMMARY

An apparatus for a head mounted display is disclosed. The apparatus, in one embodiment, includes a frame supporting at least one projection surface, the frame configured to maintain the at least one projection surface in a position adjacent to and viewable by at least one eye of a user. The apparatus also includes at least one projection device coupled to the frame and configured to project an image onto the at least one projection surface, and at least one non-fused optical fiber bundle coupled at a first end to the at least one projection device, the at least one optical fiber bundle configured to transmit an optical image to the projection device, and where the at least one optical fiber bundle is coupled at a second end to a remote image source.

In one embodiment, the at least one projection device is positioned on the frame so that when the frame is worn by a user, the at least one projection device is positioned adjacent a temple of the user's head. Additionally, a light path from the at least one projection device extends in a first direction towards the projection surface, and reflects in a second direction towards an eye of the user. In one embodiment, the first direction forms an angle of less than or equal to 45 degrees with the second direction. In another embodiment, a first length of the light path between the at least one projection device and a center of the projection surface is greater than a second length of the light path between the center of the projection surface and the user's eye.

In another embodiment, the at least one projection surface is a concave, partially spherical surface. The projection surface may have a constant radius of curvature. In a further embodiment, the apparatus includes a projection mapper configured to receive the image from the remote image source and generate a distorted image that when projected onto the projection surface, appears undistorted. The apparatus may also include an accelerometer disposed with the projection device, and configured to communicate with the projection mapper a current position and orientation of the projection surface.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Aspects of the present disclosure may be embodied as a head mounted display configured to communicate with a remote display source, and project images/video from the remote display source onto a surface viewable by a wearer of the head mounted display. The features of the below disclosed embodiments beneficially reduce the weight of the head mounted display by remotely positioning components used to generate the images/video. Various aspects of the present disclosure may take the form of an entirely hardware embodiment, an entirely software embodiment (including firmware, resident software, micro-code, etc.) or an embodiment combining software and hardware, that may all generally be referred to herein as a "circuit," "module" or "system." Furthermore, aspects of the present disclosure may take the form of a computer program product embodied in one or more computer readable storage media having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable storage media.

Any combination of one or more computer readable storage media may be utilized. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a blu-ray disc, an optical storage device, a magnetic tape, a Bernoulli drive, a magnetic disk, a magnetic storage device, a punch card, integrated circuits, other digital processing apparatus memory devices, or any suitable combination of the foregoing, but would not include propagating signals. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Python, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the disclosure may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. However, the disclosure may be practiced without one or more of the specific details, or with other methods, components, materials, and so forth. In other instances, well-known structures, materials, or operations are not shown or described in detail to avoid obscuring aspects of the disclosure.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the schematic flowchart diagrams and/or schematic block diagrams block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

The description of elements in each figure may refer to elements of proceeding figures. Like numbers refer to like elements in all figures, including alternate embodiments of like elements.

Figure 1:
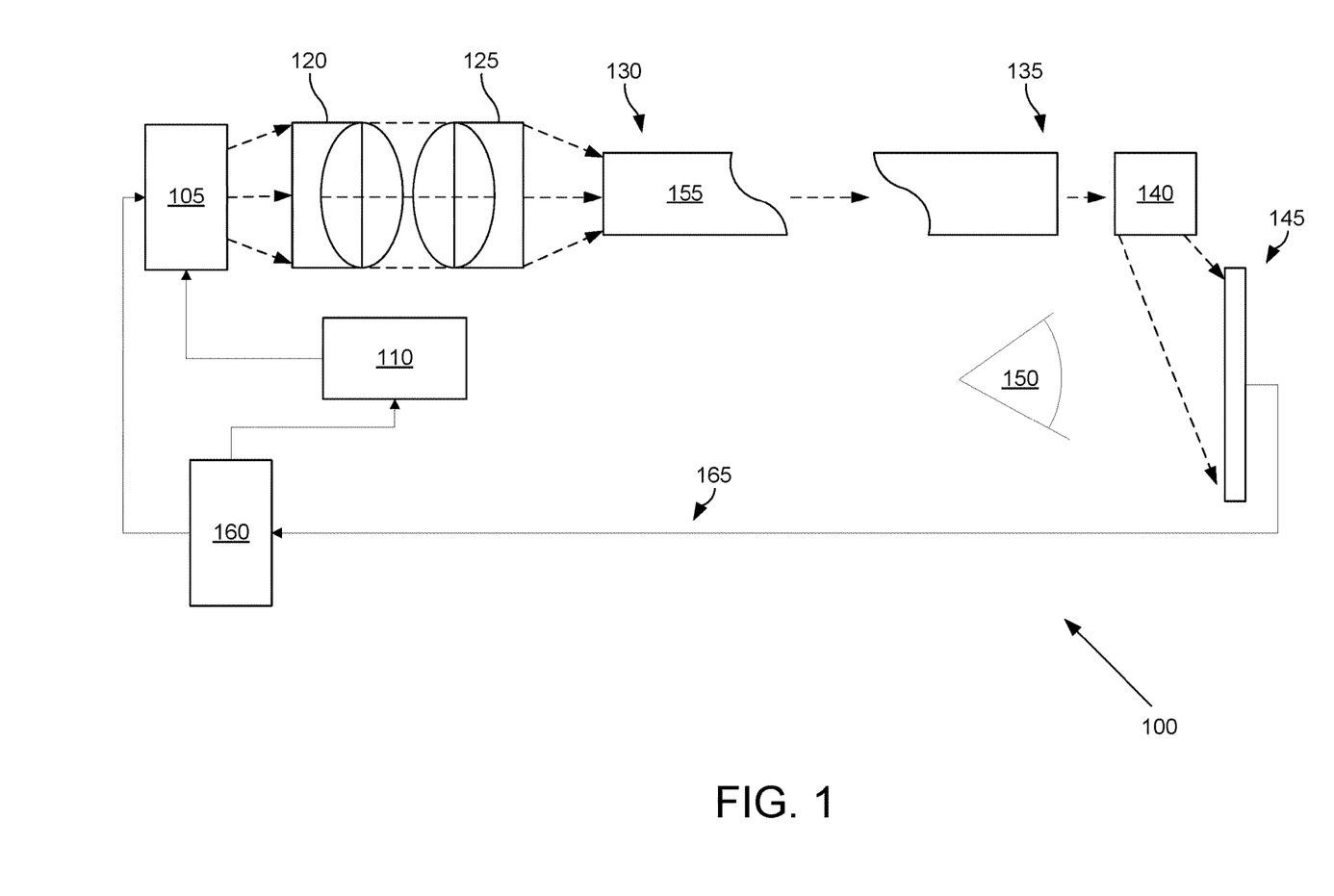
FIG. 1 is a functional block diagram of a near-to-eye optical system implemented with a fiber optic bundle for use with a head mounted display (HMD), in accordance with an embodiment of the invention.

FIG. 1 is a functional block diagram of a near-to-eye optical system implemented with a fiber optic bundle for use with a head mounted display (HMD), in accordance with an embodiment of the invention. The illustrated near-to-eye optical system 100 includes an image source 105, a projection mapping module 110, a relay lens 125, a fiber optic cable 155, a projection lens 140, a projection surface 145, and a computer 160.

The relay lens 125 is provided to re-image the output of the image source 120 onto the input end 130 of the fiber optic cable 155. Depending on the size of the image source 105 relative to the size of the input end of the fiber optic cable 130, the relay lens may magnify or reduce the source image 120. In one example, a relay lens 125 may be positioned near a display device such as a monitor or a projector. In other words, the relay lens 125 receives as input an image from any device that is configured to present an image.

In one embodiment, only one image is transmitted via the optical system 100. In another embodiment, a plurality of images may be transmitted by the optical system 100. For example, one image for each eye may be transmitted (to generate a stereoscopic 3D images for use in virtual reality, for example) or even multiple images for each eye.

In one embodiment, the image transmitted by the fiber optic cable is enhanced either by wavelength multiplexing or dynamic scanning. In both techniques, a single picture element or pixel is distributed over many individual fibers at the input end of the cable 130 and is recombined at the output end of the cable 135. Both techniques increase the maximum resolution capability of the fiber optic cables and reduce the visibility of the fiber optic structure.

The fiber bundle 155 may assume a variety of sizes, shapes, and lengths; however, when used in connection with an HMD, it may be used to transport a light image 120 from an image source 105 located out of the eye's field of view or from a source location not otherwise attached to the HMD to a location in front of the eye 150. The light image is transmitted through the output end 135 of the fiber optic cable and through a lens 140 that projects the image onto a projection surface 145. The fiber bundle 155, in one embodiment is, at least partially, a non-fused fiber bundle. This beneficially allows for movement of the fiber bundle because the fiber bundle remains flexible. Fused fiber bundles, on the other hand are primarily rigid.

The projection surface 145 may be curved or flat or contain a plurality of surfaces; for example, a surface for each eye. A curved projection surface 145, as depicted below with reference to FIG. 3, enhances the "reality" of the projected virtual environment. Beneficially, a curved projection surface results in a surface that is formed having a substantially uniform radial distance from any point on the surface to the eye. The projection surface may be transparent, translucent, or opaque. In one embodiment, the projection surface is coated with a reflective coating, including but not limited to, magnesium carbonate or titanium dioxide, that results in a gain in the range of between about 0.8 and 2.5.

As is known to those skilled in the relevant art, projection mapping is a technique used to create an undistorted image on a non-planar or irregularly shaped display surface (such as a building or a dome), and/or in situations where the projector is positioned at a non-orthogonal angle to the display surface.

In the illustrated near-to-eye optical system 100, a projection mapping module 110 is coupled to the output of the image source 120 so that, in combination with the projection lens 140, the image displayed on the projection surface 145 is not distorted.

For example, it is possible to create a modified fisheye image so that if viewed from a particular position the projected image will appear undistorted, often called an off-axis fisheye image. In this embodiment, a (fisheye) projection lens 140 can be placed at the periphery of a (curved) projection surface 145. Similarly, stereo pairs of an off-axis (asymmetric) perspective for each eye may be created.

In one embodiment, the projection mapping module 110 is an electronic module, as described above, which comprises a combination of hardware and/or software. For example, the computer may communicate with the projection mapping module 110 to adjust the image source 105 according to the HMD setup (i.e., specific configuration and shape of the lenses). In this embodiment, the projection mapping module 110 creates the modified fish eye image that is then projected onto the curved surface, which when viewed by the wearer of the HMD, appears normal.

Additionally, the computer 160 can receive position information 165 from the HMD so that the viewing angle may be tracked and the image 120 can be updated relative to a virtual environment. In other embodiments, the projection mapping module 110 may reside and operate solely on the computer 160. Alternatively, portions of the projection mapping module 110 may be configured to operate on the computer 160, while other portions of the projection mapping module 110 are configured to operate on the HMD.

Figure 2:
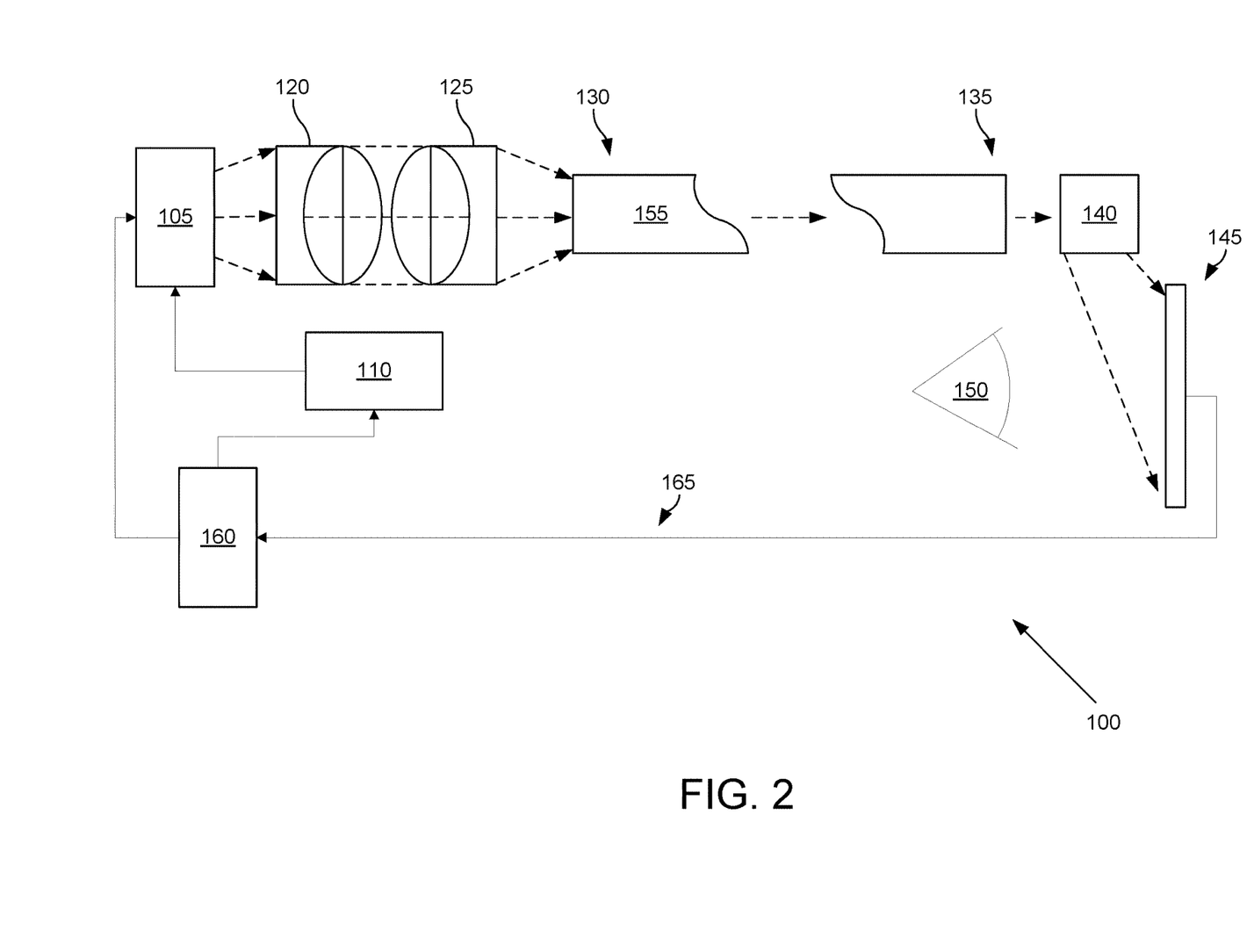
FIG. 2 is a schematic block diagram of another embodiment of the HMD in accordance with embodiments of the invention.

FIG. 2 is a schematic block diagram of another embodiment of the HMD in accordance with embodiments of the invention. In the depicted embodiment, the projection mapping module 110 comprises a physical lens or lenses, which are shaped, configured, positioned, oriented, etc., to transform an image to properly map onto the lens of the HMD. In other words, the projection mapping module 110 may be a passive device that operates to transform an image without any input from the computer 160.

In an embodiment where multiple projection lenses are used, the image 120 may be divided or masked so that a portion of the image 120 is transmitted to specific projection lenses 140. For example, when projecting on the inside surface of a dome, it may be advantageous to use multiple projection lenses 140. In this instance, the source image 120 may be divided in such a way that a portion of the source image 120 is sent to specific projection lenses 140 so that the source image is correctly displayed on the projection surface 145.

The precise projection mapping module 110 (whether done electronically or in combination with a physical lens) and the precise projection lens 140 depends on the shape of the projection surface and the desired user experience.

Figure 3:
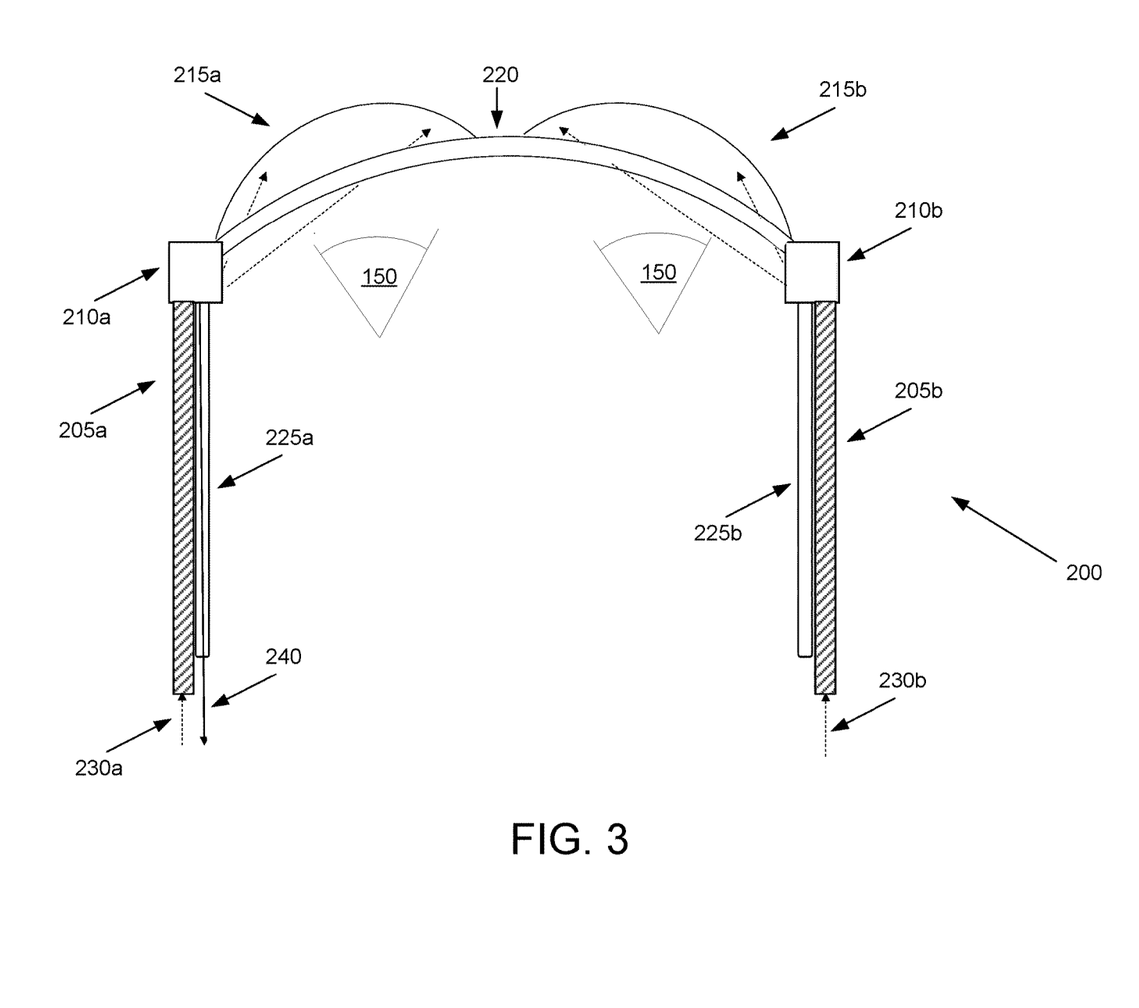
FIG. 3 is a perspective view of an HMD to deliver near-to-eye images in accordance with an embodiment of the invention.

FIG. 3 is a perspective view of an HMD 200 to deliver near-to-eye images in accordance with an embodiment of the invention. The illustrated embodiment of HMD 200 includes a frame assembly and a pair of optical systems. The illustrated embodiment of the frame assembly includes a frame 220 and ear members 225A and 225B. The illustrated embodiment of the pair of optical systems includes projection lenses 210A and 210B, projection surfaces (or devices) 215A and 215B, optical fiber bundles 205A and 205B, and source images 230A and 230B. It should be appreciated that the optical system illustrated in FIG. 3 may be implemented with any of the optical systems disclosed above, or some combination thereof.

The two optical systems are secured to the frame assembly to form an eye glass arrangement that can be worn on the head of user. The ear members 225 rest over the user's ears. In another embodiment, the ear members 225 may not be necessary as the fiber optic cable could rest on the user's ears and function as the ear members. The frame assembly is shaped and sized to position the projection surfaces of each optical system in front of a corresponding eye 150 of a user.

In one embodiment of the invention, the fiber optic cable 205 is attached to the ear member(s) and the projection lens 210 is located at or near the user's temples.

In another embodiment, the fiber optic cable 230 and projection lens 210 may be attached to the nose bridge.

In an embodiment of the invention, the fiber optic cable 205 may be detached from the HMD. The HMD 200 may also contain an accelerometer and/or gyroscope (embedded within the projection lens housing 210a,b) so that the viewing angle may be tracked and the image 230 updated relative to a virtual environment, such as in virtual or augmented reality. Power and data can be communicated over cable 240.

Figure 4:
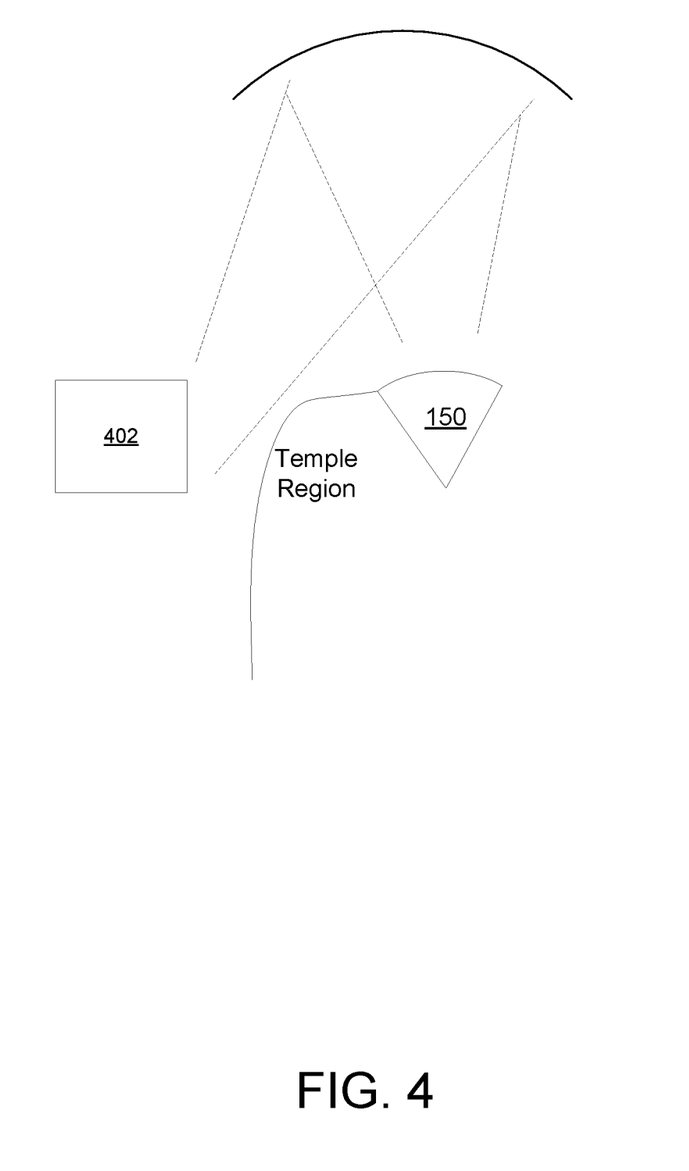
FIG. 4 is a schematic block diagram illustrating one embodiment of the positioning of the projection device in accordance with embodiments of the present disclosure.

FIG. 4 is a schematic block diagram illustrating one embodiment of the positioning of the projection device 402 in accordance with embodiments of the present disclosure.

As described above, the projection device 402 is mounted to the HMD frame and positioned adjacent the temple region of a user's face. Dashed lines represent the path light travels from the projection device 402 to the curved projection surface and then to the user's eye 150.

In some embodiments, the projection device 402 casts an image in a first direction to the projection surface, which is then reflected in a second direction to the user's eye. In one embodiment, the first direction forms an angle with the second direction that is less than or equal to 45 degrees. In other words, the light path, in the depicted embodiment only reflects once, through an angle of less than or equal to 45 degrees. Additionally, the projection surface is formed having a concave profile. The radius through the profile, as depicted, may be consistent. In an alternative embodiment, and as depicted above with reference to FIG. 3, the radius of curvature may vary.

In one embodiment, the projection device 402 is positioned such that the light path from the projection device 402 to the center of the projection surface is greater than or substantially equal in length to the light path from the projection surface to the user's eye. In other words, the projection device 402 may be positioned adjacent the user's eye, but at a distance from a center point of the projection surface that is greater than a distance from the center point of the projection surface to the user's eye.

Figure 5:
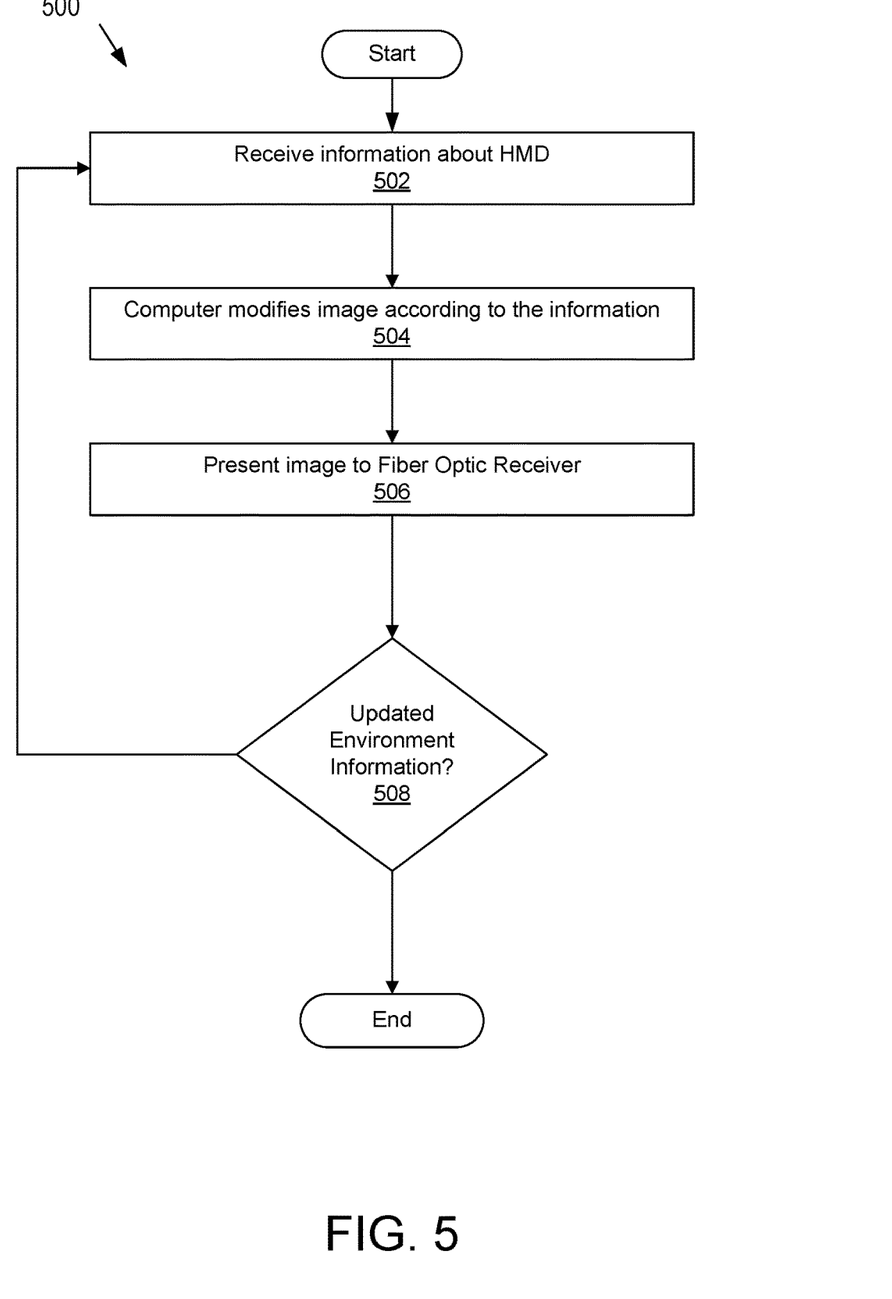
FIG. 5 is a schematic block diagram illustrating one embodiment of a method for actively modifying images/video to be presented by the head mounted display.

FIG. 5 is a schematic block diagram illustrating one embodiment of a method 500 for actively modifying images/video to be presented by the head mounted display. The method is performed by processing logic that may comprise hardware (circuitry, dedicated logic, etc.), software (such as is run on a general purpose computer system or a dedicated machine), or a combination of both. In one embodiment, the method is performed by the projection mapping module 110 of FIGS. 1-3.

The method 500 begins, and the processing logic, at block 502, receives information about the HMD. In one embodiment, the processing logic receives configuration information related to the HMD. Examples of such configuration information can include, but are not limited to, a size and shape of each projection surface, or the type of projection lens, etc. Configuration information is useful in determining how to modify the image/video so that the image/video is displayed properly on the projection surface. In other embodiments, the HMD receives positioning information from the HMD. For example, the HMD may include accelerometers and/or gyroscopes for determining a current viewing orientation (i.e., the angle and direction in which the user is currently "looking"). Such information is useful for selecting which portion of a virtual reality to present to the user.

The processing logic, at block 504, modifies the image/video according to the received configuration/orientation/environment information. In one embodiment, the processing logic modifies the image/video in a manner consistent with that described above with reference to FIGS. 1-3. The processing logic then, at block 506, transmits the modified image/video via the fiber optic coupling and presents the image/video. If the processing logic determines that the orientation/environment information has changed, at block 508, the processing logic repeats the method, starting at block 502. Otherwise, the method 500 ends.

Figure 6:
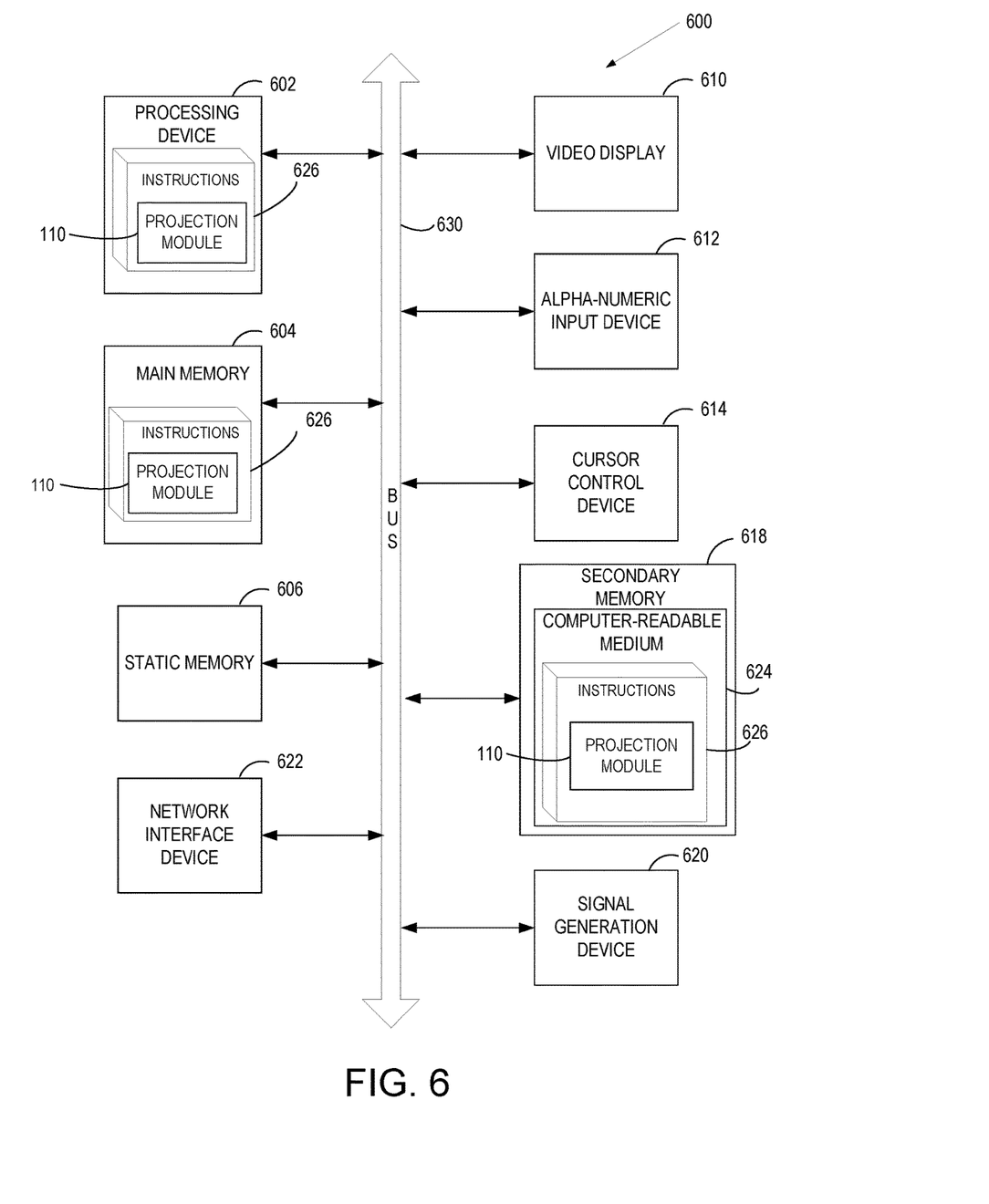
FIG. 6 is a diagram of one embodiment of a computer system for use with a head mounted display.

FIG. 6 is a diagram of one embodiment of a computer system for use with a head mounted display. Within the computer system 600 is a set of instructions for causing the machine to perform any one or more of the methodologies discussed herein. In alternative embodiments, the machine may be connected (e.g., networked) to other machines in a LAN, an intranet, an extranet, or the Internet. The machine may be a host in a cloud, a cloud provider system, a cloud controller or any other machine. The machine may operate in the capacity of a server or a client machine in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or DRAM (RDRAM), etc.), a static memory 606 (e.g., flash memory, static random access memory (SRAM), etc.), and a secondary memory 618 (e.g., a data storage device in the form of a drive unit, which may include fixed or removable computer-readable storage medium), which communicate with each other via a bus 630.

The processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute the instructions 626 for performing the operations and steps discussed herein.

The computer system 600 may further include a network interface device 622. The computer system 600 also may include a video display unit 610 (e.g., a liquid crystal display (LCD) or a cathode ray tube (CRT)) connected to the computer system through a graphics port and graphics chipset, an alphanumeric input device 612 (e.g., a keyboard), a cursor control device 614 (e.g., a mouse), and a signal generation device 620 (e.g., a speaker).

The secondary memory 618 may include a machine-readable storage medium (or more specifically a computer-readable storage medium) 624 on which is stored one or more sets of instructions 626 embodying any one or more of the methodologies or functions described herein. In one embodiment, the instructions 626 include instructions for the projection module 110. The instructions 626 may also reside, completely or at least partially, within the main memory 604 and/or within the processing device 602 during execution thereof by the computer system 600. The main memory 604 and the processing device 602 also constituting machine-readable storage media.

The computer-readable storage medium 624 or computer storage device may also be used to store the instructions 626 persistently. While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The instructions 626, components and other features described herein can be implemented as discrete hardware components or integrated in the functionality of hardware components such as ASICS, FPGAs, DSPs or similar devices. In addition, the instructions 626 can be implemented as firmware or functional circuitry within hardware devices. Further, the instructions 626 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "providing," "generating," "detecting," "identifying," "storing," "receiving," "sending," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment. Like reference numbers signify like elements throughout the description of the figures.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A head mounted display (HMD) comprising:
   a frame supporting at least one projection surface that is opaque, concave, and partially spherical, the frame configured to maintain the at least one projection surface in a position adjacent to and viewable by at least one eye of a user;
   a projection mapper configured to receive an image from a remote image source and generate a distorted image of the image based on configuration information of the at least one projection surface, so that when the distorted image is projected onto the at least one projection surface the distorted image appears not distorted, where the configuration information comprises a projection surface size, a projection surface curvature, and a type of a projection lens;
   at least one projection device comprising the projection lens and coupled to the frame and configured to project the distorted image onto the at least one projection surface; and
   at least one non-fused optical fiber bundle coupled at a first end to the at least one projection device, the at least one optical fiber bundle configured to transmit the distorted image to the projection device, and where the at least one optical fiber bundle is coupled at a second end to the remote image source.

2. The HMD of claim 1, where the at least one projection device is positioned on the frame so that when the frame is worn by a user, the at least one projection device is positioned adjacent a temple of the user's head.

3. The HMD of claim 2, where a light path from the at least one projection device extends in a first direction towards the at least one projection surface, and reflects in a second direction towards an eye of the user.

4. The HMD of claim 3, where the first direction forms an angle of less than or equal to 45 degrees with the second direction.

5. The HMD of claim 3, where a first length of the light path between the at least one projection device and a center of the at least one projection surface is greater than a second length of the light path between the center of the at least one projection surface and the user's eye.

6. The HMD of claim 1, where the at least one projection surface has a constant radius of curvature.

7. The HMD of claim 1, further comprising an accelerometer disposed with the projection device, and configured to communicate with the projection mapper a current position and orientation of the at least one projection surface.

8. A system for virtual reality comprising:
   a head mount display (HMD) comprising:
      a frame supporting an opaque projection surface that is concave and partially spherical, the frame configured to maintain the projection surface in a position adjacent to and viewable by an eye of a user;
      a projection mapper configured to receive an image from a remote image source and generate a distorted image of the image in response to configuration information of the opaque projection surface, so that when the distorted image is projected onto the opaque projection surface the image appears not distorted, where the configuration information comprises a projection surface size, a projection surface curvature, and a type of a projection lens;
      a projection device comprising the projection lens and coupled to the frame and configured to project the distorted image onto the projection surface; and
      an optical fiber bundle coupled at a first end to the projection device, the optical fiber bundle configured to transmit the distorted image to the projection device, and where the optical fiber bundle is coupled at a second end to the remote image source.

9. The system of claim 8, where the projection device is positioned on the frame so that when the frame is worn by a user, the projection device is positioned adjacent a temple of the user's head.

10. The system of claim 9, where a light path from the projection device extends in a first direction towards the projection surface, and reflects in a second direction towards an eye of the user.

11. The system of claim 10, where the first direction forms an angle of less than or equal to 45 degrees with the second direction.

12. The system of claim 10, where a first length of the light path between the at least one projection device and a center of the projection surface is greater than a second length of the light path between the center of the projection surface and the user's eye.

13. The system of claim 8, where the projection surface has a constant radius of curvature.

14. The system of claim 8, further comprising an accelerometer disposed with the projection device, and configured to communicate with the projection mapper a current position and orientation of the projection surface.

15. A frame wearable on the head of a user, the frame comprising:
- a plurality of ear members extending from the frame and configured for supporting the frame on ears of the user;
- a nose bridge configured for supporting the frame on the nose of the user;
- a projection surface positioned adjacent to and viewable by an eye of a user, where the projection surface is concave and partially spherical;
- a projection mapper configured to receive an image from a remote image source and generate a distorted image of the image in response to configuration information of the at least one projection surface, so that when the distorted image is projected onto the at least one projection surface the distorted image appears not distorted, where the configuration information comprises a projection surface size, a projection surface curvature, and a type of a projection lens;
- a projection device comprising the projection lens and configured to project the distorted image onto the projection surface, where the projection device is positioned on the frame such that when worn by a user, the projection device is adjacent a temple of the user; and
- an optical fiber bundle coupled at a first end to the projection device, the optical fiber bundle configured to transmit an optical image to the projection device, and where the optical fiber bundle is coupled at a second end to the remote image source.

16. The frame of claim 15, where a light path from the projection device extends in a first direction towards the projection surface, and reflects in a second direction towards an eye of the user.

* * * * *